J. E. DEKKER.
WHEEL MOUNTING.
APPLICATION FILED APR. 24, 1918.
1,402,149.
Patented Jan. 3, 1922.
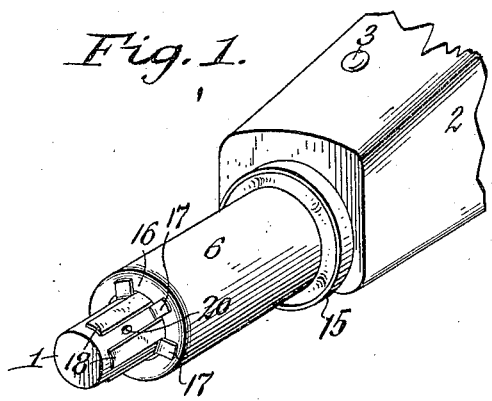
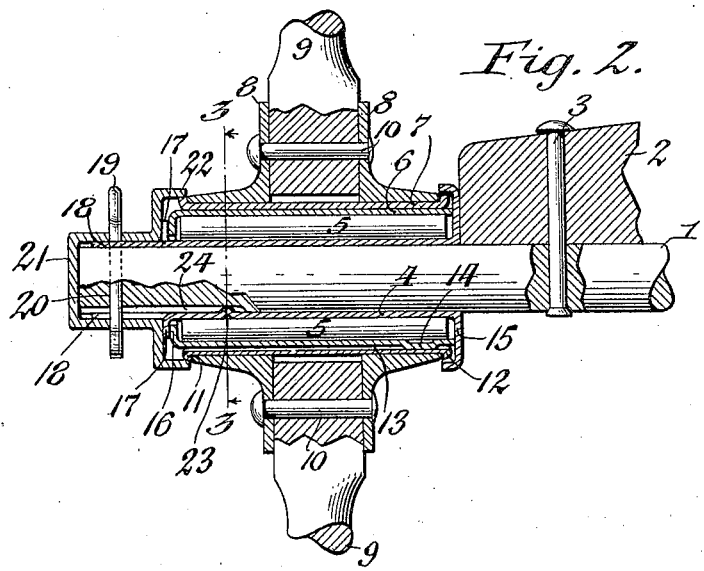
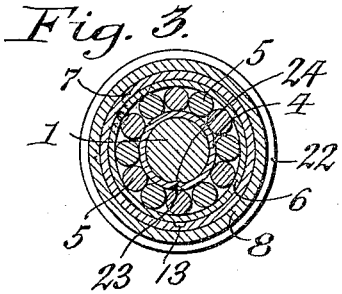
Inventor;
John E. Dekker
by Meyer & Papp
Attorneys.

UNITED STATES PATENT OFFICE.

JOHN E. DEKKER, OF OAK PARK, ILLINOIS, ASSIGNOR TO THE BUFFALO SLED COMPANY, OF NORTH TONAWANDA, NEW YORK, A CORPORATION OF NEW YORK.

WHEEL MOUNTING.

1,402,149. Specification of Letters Patent. Patented Jan. 3, 1922.

Application filed April 24, 1918. Serial No. 230,385.

*To all whom it may concern:*

Be it known that I, JOHN E. DEKKER, a citizen of the United States, residing at Oak Park, in the county of Cook and State of Illinois, have invented new and useful Improvements in Wheel Mountings, of which the following is a specification.

This invention relates to a mounting for wheels designed more particularly for wheels which are used on toy wagons, although the same may also be used for larger wheeled vehicles and for other purposes.

The object of this invention is to produce a wheel mounting which can be produced at comparatively low cost, which is strong and durable in construction, and which will permit a wheel to run easily and without undue wear or noise.

In the accompanying drawings:

Figure 1 is a perspective view, showing the bearing portion of my improved wheel mounting applied to the axle of a vehicle. Figure 2 is a vertical longitudinal section of my improved wheel mounting associated with the wheel and axle. Figure 3 is a vertical transverse section taken on the correspondingly-numbered line in Fig. 2.

Similar characters of reference indicate corresponding parts in the several views.

1 represents the vehicle axle which is preferably cylindrical in cross section and has secured thereto at a distance from its end, a bolster 2 which is usually constructed of wood, this connection being effected by means of a rivet 3, as shown in Fig. 2, or otherwise. Upon the front end portion of the axle is mounted the inner bearing sleeve 4 of a roller bearing. 5 represents a plurality of bearing rollers which are arranged lengthwise or parallel with the axle and in an annular row, so that the inner sides of these rollers engage with the periphery of the inner bearing sleeve. 6 represents an outer bearing sleeve which engages its bore or inner side with the outer sides of the several bearing rollers. The inner and outer bearing sleeves and the bearing rollers constitute the main elements of the roller bearing whereby the wheel is mounted upon the axle. The wheel thus mounted may be of any suitable construction, that shown in the drawings consisting essentially of a hub sleeve 7 which engages with the periphery of the outer bearing sleeve, two supporting disks 8, 8, arranged upon opposite ends of the hub sleeve and spaced apart, and a plurality of spokes 9 which are arranged at their inner ends between the supporting disks and are connected therewith by means of rivets 10, as shown in Fig. 2, or by any other suitable means. The hub sleeve is secured in the hub disks so as to be incapable of moving lengthwise or axially therein by providing opposite ends of this hub sleeve with outwardly-turned flanges 11, 12, between which the hub disks are arranged. The hub sleeve and its flanges 11, 12 are preferably constructed of sheet metal and when assembled with the other members of the wheel, form a practically inseparable structure. The outer bearing sleeve preferably fits into the bore of the hub sleeve sufficiently tight so as to compel the wheel and outer bearing sleeve to turn together about the axle, thereby causing the rollers between the bearing sleeves to turn bodily around the axle and form an anti-friction support for the wheel.

In order to compel the wheel and the outer bearing sleeve to turn together, a positive locking means between the same is provided which preferably comprises a longitudinal keyway 13 formed in the bore of the hub sleeve and an outwardly-projecting key 14 formed on the periphery of the outer bearing sleeve and engaging with this keyway, as best shown in Fig. 2.

At its rear end the inner bearing sleeve is provided with a dished or cup-shaped annular flange 15 which extends laterally therefrom past the rear ends of the outer bearing sleeve and the hub sleeve and encloses the adjacent rear flange 12 of the hub sleeve, as shown in Fig. 2.

At its front end the outer bearing sleeve is provided with an inwardly-projecting annular flange 16 which confines the bearing rollers in the space between the two bearing sleeves. At the front end of the inner bearing sleeve the same is provided with two annular rows of lips or lugs 17, 18 the lips 17 being comparatively short and projecting laterally or radially outward from the inner bearing sleeve into a position in front of the front flange of the outer bearing sleeve while the lips 18 are comparatively long and alternate with the short lips and project longitudinally forward from the inner bearing sleeve, so that they surround the front end portion of the axle. The front lips or lugs and the rear flange 15 are preferably formed integral with the inner bearing sleeve from a single piece of sheet metal. When the parts of this roller bearing are assembled in the manner shown in Fig. 2, they are permanently associated and can be freely handled in assembling the same with other parts of the wagon without liability of becoming scattered, thereby avoiding the loss of parts and effecting a considerable economy in time of handling the same.

The roller bearing as a whole is held against turning on the axle by means of a locking pin 19 preferably of the cotter type passing through a transverse opening 20 in the front end of the axle and between adjacent longitudinal lips of the inner bearing sleeve. This same pin is also preferably utilized for fastening a cap 21 to the front end of the axle, which cap is provided with openings on diametrically opposite sides for receiving the end portions of the fastening or locking pin and also with a dish-shaped flange 22 at its rear end which extends laterally beyond the front end of the hub sleeve, so as to form a stop which prevents the wheel from slipping forwardly off from the roller bearing, when assembled.

If desired, the inner bearing sleeve may be additionally secured to the axle so as to prevent the same from turning thereon but capable of sliding lengthwise thereon by means of an internal key 23 formed integrally with the inner bearing sleeve and projecting into a longitudinal keyway 24 extending from the front end of the axle rearwardly a sufficient distance to accommodate the position of this key, as shown in Fig. 2.

The various elements of this wheel mounting are comparatively simple in construction and are capable of being produced economically and afford a very strong, durable and easy running structure which requires little or no lubrication, thereby rendering the same particularly desirable for use in the running gears of juvenile wagons or carts.

I claim as my invention:

1. The combination of an axle, an inner bearing sleeve mounted on the axle, a plurality of bearing rollers engaging with the outer side of said inner bearing sleeve, an outer bearing sleeve engaging with the outer sides of said bearing rollers, and a wheel having a hub sleeve which receives said outer bearing sleeve, said hub sleeve having an internal longitudinal key-way, and said outer bearing sleeve having an integral external key engaging with said key-way.

2. The combination of an inner bearing sleeve of smaller diameter provided at one end with a plurality of outwardly-projecting lips, a plurality of bearing rollers engaging with the outer side of said inner bearing sleeve, and an outer bearing sleeve of larger diameter engaging with the outer side of said bearing rollers and provided at one end with an inwardly projecting flange which engages with the rear side of said lips.

3. The combination of an inner bearing sleeve of smaller diameter provided at one end with a plurality of laterally projecting lips which are arranged in an annular row and a plurality of longitudinally projecting lips which alternate with said laterally projecting lips, an outer bearing sleeve of larger diameter provided at one end with an inwardly-turned flange which is arranged in rear of said laterally projecting lips, and an annular row of bearing rollers arranged between said bearing sleeves.

4. The combination of an inner bearing sleeve provided at one end with a plurality of laterally projecting lips which are arranged in an annular row and a plurality of longitudinally projecting lips which alternate with said laterally projecting lips, an outer bearing sleeve provided at one end with an inwardly-turned flange which is arranged in rear of said laterally projecting lips, an annular row of bearing rollers arranged between said bearing sleeves, an axle arranged within said inner bearing sleeve, and a locking pin passing through said axle and between adjacent longitudinal lips of said inner bearing sleeve.

5. The combination of an inner bearing sleeve provided at one end with a plurality of laterally projecting lips which are arranged in an annular row and a plurality of longitudinally projecting lips which alternate with said laterally projecting lips, an outer bearing sleeve provided at one end with an inwardly-turned flange which is arranged in rear of said laterally projecting lips, an annular row of bearing rollers arranged between said bearing sleeves, an axle arranged within said inner bearing sleeve and said longitudinal lips, a cap applied to the end of said axle and surrounding said longitudinal lips, and a locking pin passing through said cap and axle and between adjacent longitudinal lips of said inner bearing sleeve.

JOHN E. DEKKER.